United States Patent
Alp et al.

(10) Patent No.: US 9,005,785 B2
(45) Date of Patent: Apr. 14, 2015

(54) OPEN-LOOP SYSTEM AND METHOD FOR FUEL CELL STACK START-UP WITH LOW-VOLTAGE SOURCE

(75) Inventors: Abdullah B. Alp, West Henrietta, NY (US); Akbar Chowdhury, Pittsford, NY (US); Kristian M. Whitehouse, Rochester, NY (US); Matthew K. Hortop, Rochester, NY (US); Matthew C. Kirklin, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1772 days.

(21) Appl. No.: 11/860,121

(22) Filed: Sep. 24, 2007

(65) Prior Publication Data

US 2009/0081502 A1    Mar. 26, 2009

(51) Int. Cl.
  *H01M 8/04*   (2006.01)
  *H01M 16/00*   (2006.01)

(52) U.S. Cl.
  CPC ........ *H01M 16/006* (2013.01); *H01M 8/04089* (2013.01); *H01M 8/04231* (2013.01); *H01M 8/04395* (2013.01); *H01M 8/04567* (2013.01); *H01M 8/04753* (2013.01); *H01M 8/04805* (2013.01); *H01M 8/04888* (2013.01); *H01M 8/04992* (2013.01); *Y02E 60/50* (2013.01)

(58) Field of Classification Search
  None
  See application file for complete search history.

(56) References Cited

U.S. PATENT DOCUMENTS

| | | | |
|---|---|---|---|
| 5,175,439 A | 12/1992 | Harer et al. | |
| 6,369,461 B1 | 4/2002 | Jungreis et al. | |
| 6,507,506 B1 | 1/2003 | Pinas et al. | |
| 6,583,519 B2 | 6/2003 | Aberle et al. | |
| 7,682,719 B2 * | 3/2010 | Lienkamp et al. | 429/483 |
| 2002/0039671 A1 | 4/2002 | Yanagisawa | |
| 2002/0094469 A1 * | 7/2002 | Yoshizumi et al. | 429/34 |
| 2002/0110710 A1 * | 8/2002 | Keskula et al. | 429/13 |
| 2003/0232231 A1 * | 12/2003 | Stute et al. | 429/34 |
| 2004/0048118 A1 * | 3/2004 | Nakaji et al. | 429/22 |
| 2004/0048188 A1 * | 3/2004 | Hatanaka et al. | 430/270.1 |
| 2004/0076860 A1 * | 4/2004 | Aso | 429/23 |
| 2006/0141305 A1 * | 6/2006 | Kazama | 429/23 |
| 2006/0280977 A1 * | 12/2006 | Sakajo et al. | 429/23 |
| 2008/0096059 A1 * | 4/2008 | Kanie | 429/13 |

FOREIGN PATENT DOCUMENTS

| | | |
|---|---|---|
| DE | 102008047387 A1 | 4/2009 |
| EP | 1195830 A2 | 4/2002 |
| WO | WO 2005/096428 * | 8/2006 |

* cited by examiner

*Primary Examiner* — Alix Eggerding
(74) *Attorney, Agent, or Firm* — Fraser Clemens Martin & Miller LLC; James D. Miller

(57) ABSTRACT

A fuel cell system is provided that includes a fuel cell stack and an air compressor in communication with a cathode inlet, a hydrogen source in communication with an anode inlet, and a start-up battery adapted to power the air compressor. The start-up battery is at least one of a low-voltage battery and a high-voltage battery. A power conversion module is in electrical communication with the start-up battery and the air compressor. The power conversion module is adapted to boost a voltage of the start-up battery as desired and power the air compressor at start-up. A controller is in communication with the power conversion module and is adapted to set an air compressor speed based on an available electrical energy. An open-loop method of operating the fuel cell system at start-up is also provided, wherein an anode purge is scheduled based on the available electrical energy from the battery.

6 Claims, 5 Drawing Sheets

OPEN-LOOP SYSTEM AND METHOD FOR FUEL CELL STACK START-UP WITH LOW-VOLTAGE SOURCE

FIELD OF THE INVENTION

The present disclosure relates to a fuel cell system and, more particularly, to a start-up system and open-loop method for starting a fuel cell stack.

BACKGROUND OF THE INVENTION

A fuel cell has been proposed as a clean, efficient and environmentally responsible energy source for electric vehicles and various other applications. In particular, the fuel cell has been identified as a potential alternative for the traditional internal-combustion engine used in modern vehicles.

One type of fuel cell is known as a proton exchange membrane (PEM) fuel cell. The PEM fuel cell typically includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode to form a membrane-electrolyte-assembly (MEA). The MEA is often disposed between porous diffusion media (DM) which facilitate a delivery of gaseous reactants, typically hydrogen and oxygen from air, for an electrochemical fuel cell reaction.

Individual fuel cells can be stacked together in series to form a fuel cell stack. The fuel cell stack is capable of supplying a quantity of electricity sufficient to provide power to a vehicle. In a vehicle power system employing the fuel cell stack, hydrogen gas is supplied to the anodes from a hydrogen storage source, such as a pressurized hydrogen tank. The air is supplied to the cathodes by an air compressor unit. In a non-hybrid fuel cell vehicle or a hybrid vehicle with an inoperable high-voltage battery, a low-voltage battery is typically employed to power vehicle components and the air compressor unit prior to operation of the fuel cell stack. In a hybrid fuel cell vehicle, a high-voltage hybrid battery adapted to store electrical energy from previous vehicle operation may also be used as a source of electrical energy prior to fuel cell stack operability. Start-up with the low-voltage battery is also generally necessary with fuel cell vehicles in freezing conditions.

During start-up of the fuel cell system, hydrogen gas is used to purge the anodes of air accumulated during shut-down. The purge is desirably rapid to minimize the known carbon degradation that occurs as the hydrogen-air front moves across the anodes. Air is also bypassed to an exhaust of a fuel cell stack during start-up to dilute exhausted purge hydrogen. Vehicle emissions standards generally require the exhausted hydrogen concentration to be less than four percent (4%) by volume. However, due to the inconsistent conditions of the fuel cell system following a shut-down period, including battery state of charge (SOC) and a variable quantity of accumulated air on the anodes, known fuel cell systems are not particularly effective in optimizing hydrogen emissions and minimizing carbon corrosion during start-up.

There is a continuing need for a fuel cell system and method that provides an efficient start-up while meeting emissions and fuel cell performance requirements, for example, under freezing conditions. Desirably, the fuel cell system and method provides a robust system start-up with minimal voltage instability, and minimizes stack degradation by optimizing the hydrogen-air front time during the start-up.

SUMMARY OF THE INVENTION

In concordance with the instant disclosure, a fuel cell system and method that provides a low-voltage start-up while meeting emissions and fuel cell performance requirements, provides a robust system start-up with minimal voltage instability, and minimizes the hydrogen-air front time during the start-up, is surprisingly discovered.

In one embodiment, a fuel cell system is provided. The fuel cell system includes a fuel cell stack having a plurality of fuel cells, a cathode inlet, and an anode inlet. An air compressor is in fluid communication with the cathode inlet. A hydrogen source is in fluid communication with the anode inlet. The fuel cell system includes a start-up battery in electrical communication with the air compressor. A power conversion module is in electrical communication with the start-up battery and the air compressor. The power conversion module is adapted to selectively boost a voltage of the start-up battery supplied to the air compressor at start-up. A controller is in electrical communication with the power conversion module and is adapted to set an air compressor speed based on an available electrical energy.

In another embodiment, a method of operating the fuel cell system at start-up is also provided. The method first includes the steps of: receiving a start request; and enabling a power conversion module to boost the voltage of the low-voltage battery. The available electrical energy from the boosted low-voltage battery, and an estimated speed of the air compressor based on the available electrical energy, are then determined. The air compressor is started and is set to the estimated speed. An actual speed of the air compressor is measured, and an anode purge based on the available electrical energy is scheduled when one of a) the actual speed is greater than a desired speed, and b) a compressor ramp-up time has elapsed.

In a further embodiment, the provided method includes the step of determining the available electrical energy from at least one of a) the low-voltage battery with a voltage boost, b) a high-voltage battery with a voltage boost, and c) the high-voltage battery without a voltage boost. The start-up battery is then selected from one of the low-voltage battery and the high-voltage battery, in boosted and non-boosted states, having the greater available electrical energy.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
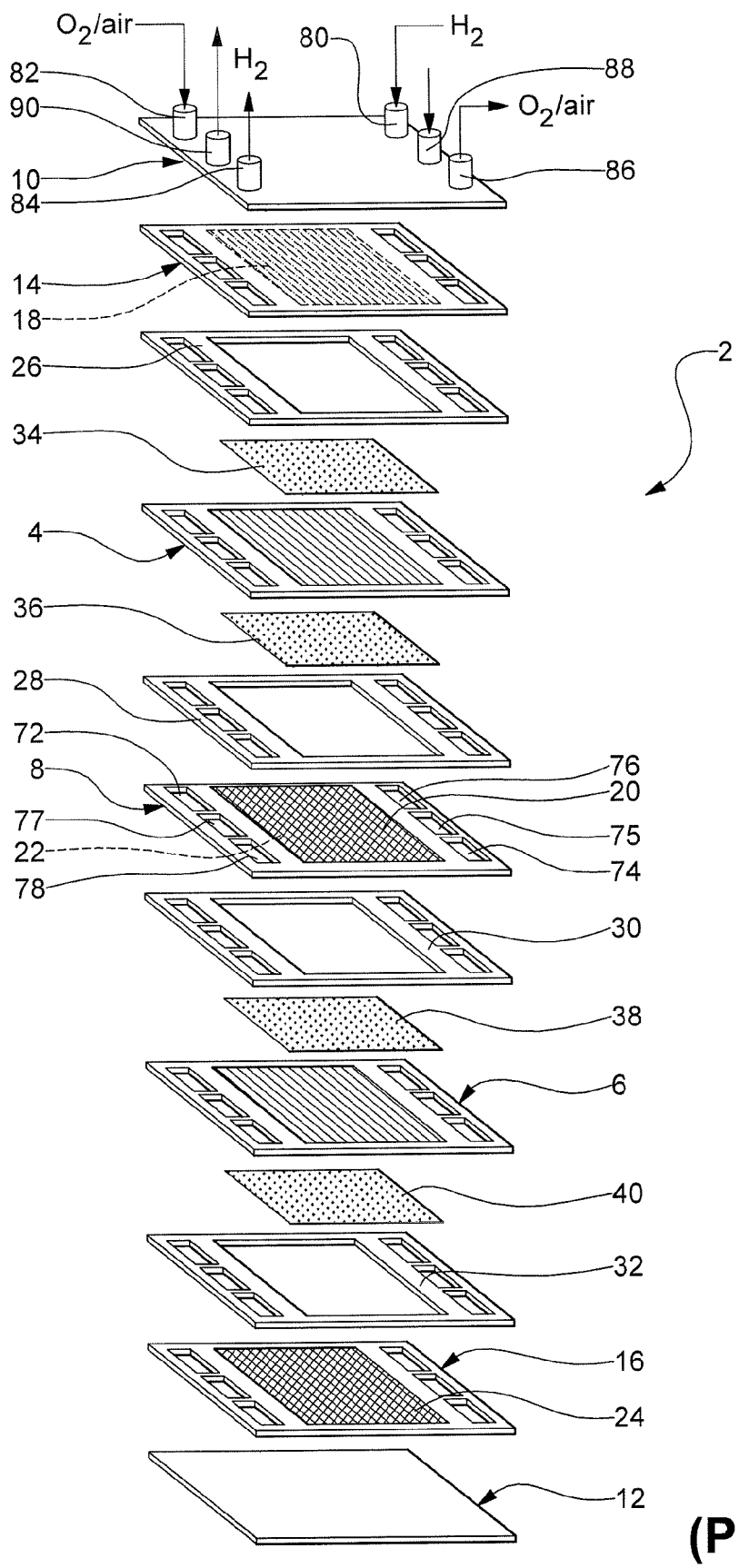
FIG. 1 illustrates a schematic, exploded perspective view of a PEM fuel cell stack of the prior art, showing only two cells.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts a fuel cell stack 2 having a pair of MEAs 4, 6 separated from each other by an electrically conductive bipolar plate 8. For simplicity, only a two-cell stack (i.e. one bipolar plate) is illustrated and described in FIG. 1, it being understood that a typical fuel cell stack will have many more such cells and bipolar plates.

The MEAs 4, 6 and bipolar plate 8 are stacked together between a pair of clamping plates 10, 12 and a pair of unipolar end plates 14, 16. The clamping plates 10, 12 are electrically insulated from the end plates 14, 16 by a gasket or a dielectric coating (not shown). The unipolar end plates 14, both working faces of the bipolar plate 8, and the unipolar end plate 16 include flowfields 18, 20, 22, 24. The flow fields 18, 20, 22, 24 distribute hydrogen gas and air over an anode and a cathode, respectively, of the MEAs 4, 6.

Nonconductive gaskets 26, 28, 30, 32 provide seals and an electrical insulation between the several components of the fuel cell stack 2. Gas-permeable diffusion media 34, 36, 38, 40 abut the anodes and the cathodes of the MEAs 4, 6. The end plates 14, 16 are disposed adjacent the diffusion media 34, 40, respectively, while the bipolar plate 8 is disposed adjacent the diffusion media 36 on the anode face of MEA 4. The bipolar plate 8 is further disposed adjacent the diffusion media 38 on the cathode face of MEA 6.

The bipolar plate 8, unipolar end plates 14, 16, and the gaskets 26, 28, 30, 32 each include a cathode supply aperture 72 and a cathode exhaust aperture 74, a coolant supply aperture 75 and a coolant exhaust aperture 77, and an anode supply aperture 76 and an anode exhaust aperture 78. Supply manifolds and exhaust manifolds of the fuel cell stack 2 are formed by an alignment of the respective apertures 72, 74, 75, 77, 76, 78 in the bipolar plate 8, unipolar end plates 14, 16, and the gaskets 26, 28, 30, 32. The hydrogen gas is supplied to an anode supply manifold via an anode inlet conduit 80. The air is supplied to a cathode supply manifold of the fuel cell stack 2 via a cathode inlet conduit 82. An anode outlet conduit 84 and a cathode outlet conduit 86 are also provided for an anode exhaust manifold and a cathode exhaust manifold, respectively. A coolant inlet conduit 88 is provided for supplying liquid coolant to a coolant supply manifold. A coolant outlet conduit 90 is provided for removing coolant from a coolant exhaust manifold. It should be understood that the configurations of the various inlets 80, 82, 88 and outlets 84, 86, 90 in FIG. 1 are for the purpose of illustration, and other configurations may be chosen as desired.

Figure 2:
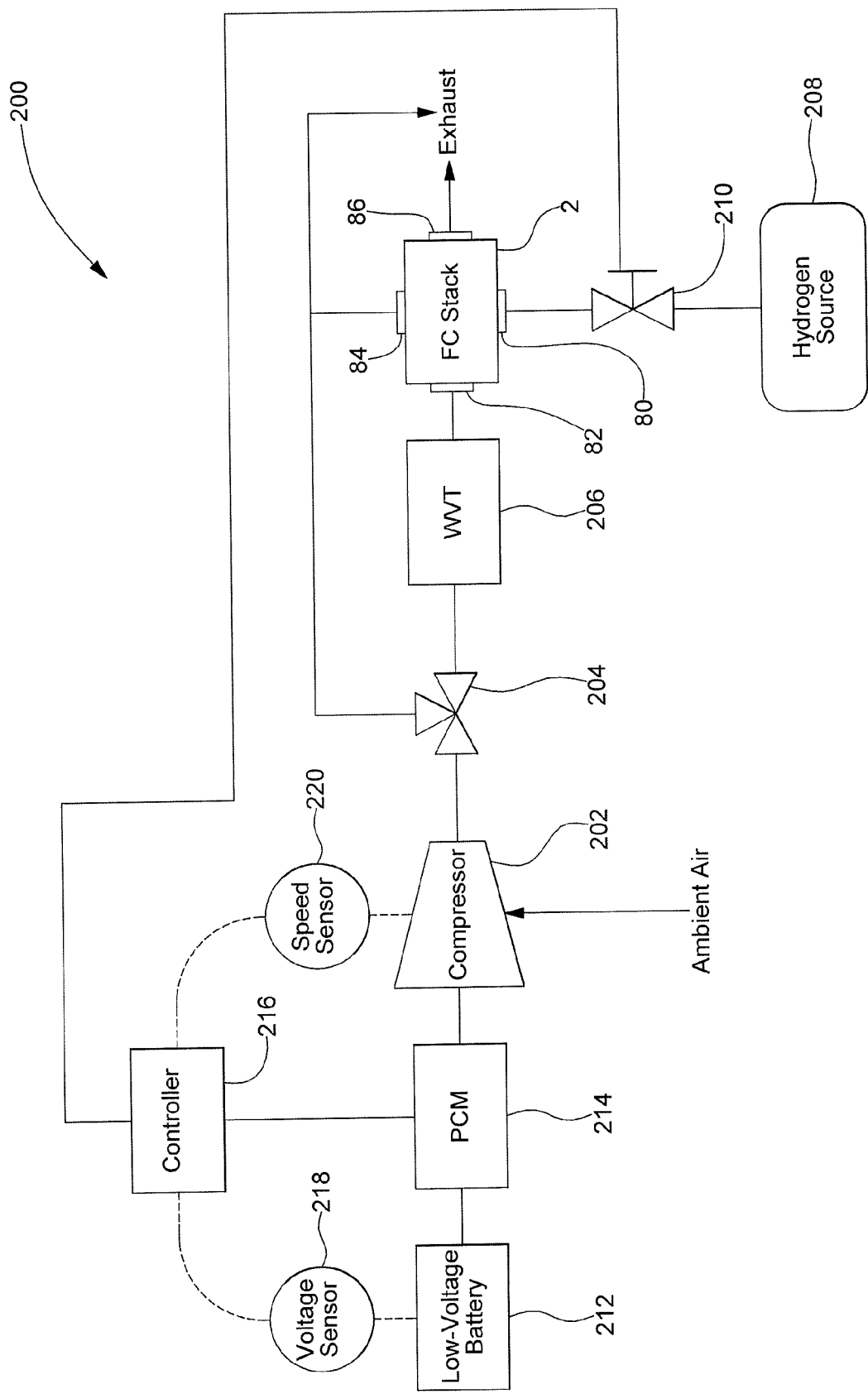
FIG. 2 is a schematic diagram of a fuel cell system having a low-voltage battery according to an embodiment of the present disclosure.

FIG. 2 shows a fuel cell system 200 according to an embodiment of the invention. The fuel cell system 200 includes the fuel cell stack 2 having a plurality of fuel cells. The fuel cell stack 2 includes the anode inlet 80, the cathode inlet 82, the anode outlet 84, and the cathode outlet 86, each in fluid communication with the respective anodes and cathodes of the fuel cell stack 2. In a particular embodiment, the fuel cell stack 2 is connected to an electrical load, such as an electrical drive motor (not shown) of a non-hybrid or hybrid fuel cell vehicle.

The fuel cell system 200 includes an air compressor 202 in fluid communication with the cathode inlet 82. The air compressor 202 is adapted to receive air, for example, from the ambient atmosphere and supply the air to the cathodes of the fuel cell stack 2. In certain embodiments, a speed of the air compressor 202 is adjustable based on the electrical energy employed to operate the air compressor 202. As a nonlimiting example, a particularly suitable air compressor 202 may have a maximum operational speed of about 80,000 rpm. A skilled artisan should understand that the speed of the air compressor 202 may be adjusted by alternative suitable means known in the art for providing a desired flow rate of air to the fuel cell stack 2.

The fuel cell system 200 further includes a bypass valve 204 disposed between the air compressor 202 and the fuel cell stack 2. The bypass valve 204 is adapted to direct a flow of the air from the air compressor 202 around the fuel cell stack 2, or to the fuel cell stack 2, as desired. In one embodiment, the bypass valve 204 directs the flow of air from the air compressor 202 to an exhaust. The air intermixes with and dilutes residual reactants and products exhausted from the fuel cell stack 2.

In certain embodiments, the fuel cell system 200 includes a water vapor transfer (WVT) unit 206, as is known in the art. A skilled artisan should understand that the WVT unit 206 is in fluid communication with both the air compressor 202 and the cathode inlet 82 of the fuel cell stack 2. The WVT unit 206 is adapted to humidify the air provided by the air compressor 202 to a level desirable for efficient operation of the fuel cell stack 2.

The fuel cell system 200 further includes a hydrogen source 208, such as a high pressure storage container for storage of compressed hydrogen gas. The hydrogen source 208 is in fluid communication with the anode inlet 80 of the fuel cell stack 2 and is adapted to supply hydrogen to the anodes of the fuel cell stack 2. For example, the fuel cell system 2 may include a regulator valve 210 in fluid communication with the hydrogen source 208 and the fuel cell stack 2. The regulator valve 210 is configured to control a flow rate of the hydrogen gas from the hydrogen source 208. It should be appreciated that the timing of the flow of the hydrogen gas to the fuel cell stack 2 may also be scheduled via the regulator valve 210.

The fuel cell system 200 of the disclosure has a start-up battery adapted to power fuel cell system 200 components, such as the air compressor 202 at start-up. In a particularly illustrative embodiment, the start-up battery is a low-voltage battery 212. It should be appreciated that, in a fuel cell system 200 employed in the operation of a non-hybrid vehicle, the low-voltage battery may be the only energy source available to power the air compressor 202 until the fuel cell stack 2 is operational. Nonlimiting examples of the low-voltage battery 212 includes a 12 V battery, a 36 V battery, and a 48 V battery. Other suitable low-voltage battery types and voltages may be selected as desired.

The fuel cell system 200 further includes a power conversion module (PCM) 214. The PCM 214 boosts a low voltage to a higher voltage that can be used by fuel cell system 200 components during start-up, for example. The PCM 214 is in electrical communication with the low-voltage battery 212 and the air compressor 202. When enabled, the PCM 214 is configured to boost a voltage output of the low-voltage battery 212, thereby providing a voltage sufficient to operate the air compressor 202 and supply the flow of air to the exhaust of the fuel cell stack 2. In particular embodiments, the PCM 214 is a bi-directional converter. One of ordinary skill in the art should understand that suitable devices adapted to increase or decrease the voltage output of a battery may be employed as desired.

A controller 216 may also be employed in the fuel cell system 200 of the disclosure. The controller 216 may be in electrical communication with the bypass valve 204, for example, and selectively direct the flow of the air. In a particularly illustrative embodiment, the controller 216 is in electrical communication with the PCM 214 and is adapted to set an air compressor 202 speed based on the available electrical energy. The controller 216 can also be adapted to control the regulator valve 210, for example, by scheduling the timing and flow rate of hydrogen to the fuel cell stack 2. As described further herein, the scheduling of the flow rate may be based on the available electrical energy from the PCM 214.

In relation to the controller 216, the fuel cell system 200 may include a variety of sensors adapted to provide system input. The system input from the sensors may be provided to the controller 216. The fuel cell system 200 includes at least one voltage sensor adapted to measure, for example, a voltage of the low-voltage battery 212. The fuel cell system 200 also may have at least one sensor adapted to measure the available electrical energy of the start-up battery, such as the electrical power or state of charge (SOC) of the start-up battery. It should be appreciated that the available electrical energy of the start-up battery may be determined by any conventional means known in the art. For example, the available electrical energy may be calculated or estimated from one or more conventional electrical measurements of the start-up battery. The fuel cell system 200 further includes a speed sensor 220. The speed sensor 220 may be adapted to measure an actual speed of the air compressor 202 in operation, for example. The actual speed may be a rotational speed of the air compressor 202.

Figure 3:
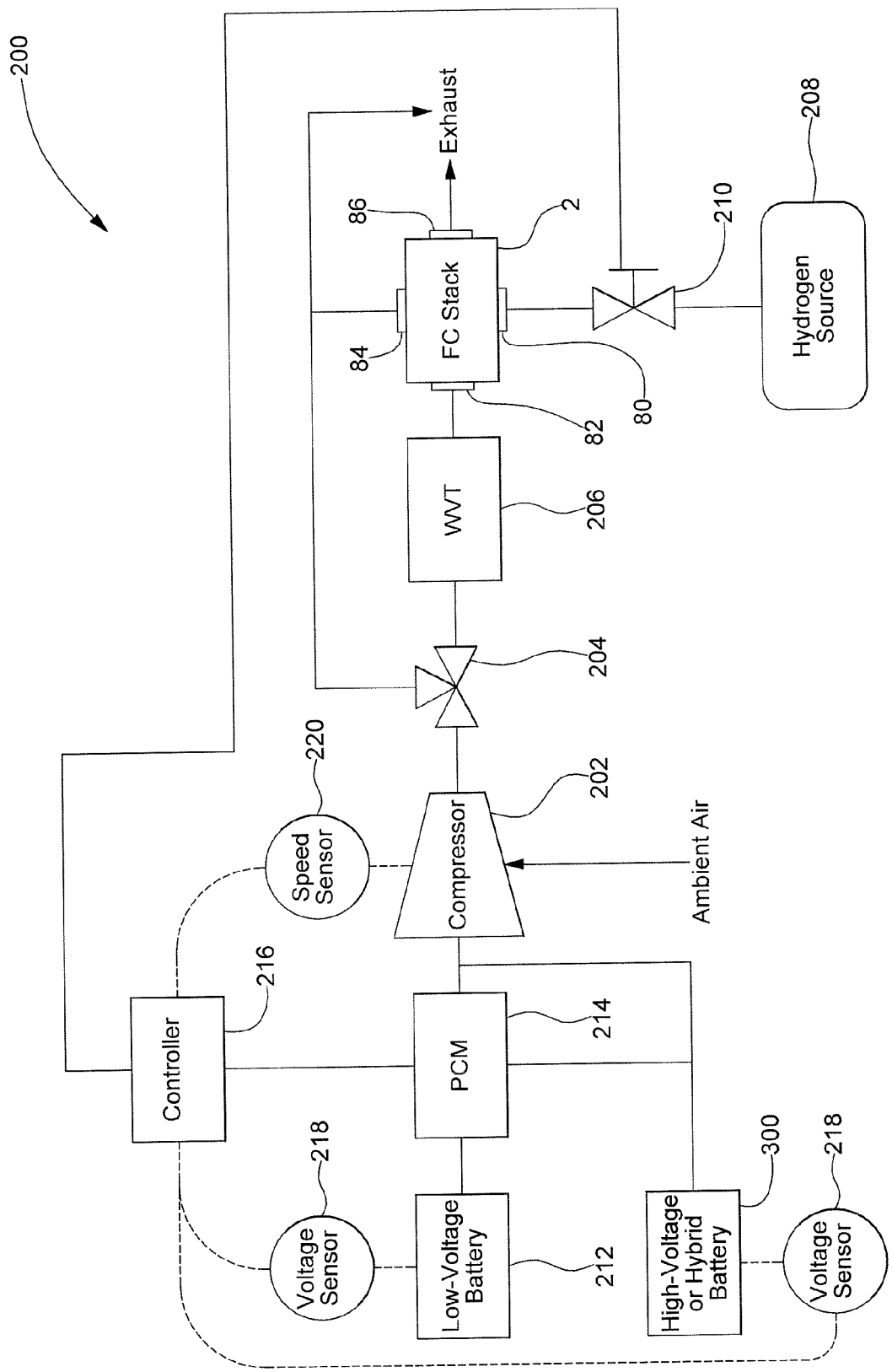
FIG. 3 is a schematic diagram of the fuel cell system of FIG. 2, further including a high-voltage battery.

As shown in FIG. 3, the fuel cell system 200 of the disclosure may further include a high-voltage battery 300. The high-voltage battery 300 is in selective electrical communication with the PCM 214 and the air compressor 202 and may be used as the start-up battery. The high-voltage battery 300, when sufficiently charged, has an electrical energy sufficient to operate the air compressor 202 during a start-up of the fuel cell system 200. As nonlimiting examples, the high-voltage battery 300 may have a voltage of up to about 500 V. In a particular example, the high-voltage battery has a voltage from about 250 V to about 400 V. In one embodiment, the high-voltage battery 300 is a hybrid battery adapted to store electrical energy generated from previous vehicle operation, for example, from a braking operation. As illustrated, the at least one voltage sensor 218 may be configured to measure a voltage of the high-voltage battery 300. The measured voltage of the high-voltage battery 300 may thereby be provided to the controller 216.

Figure 4:
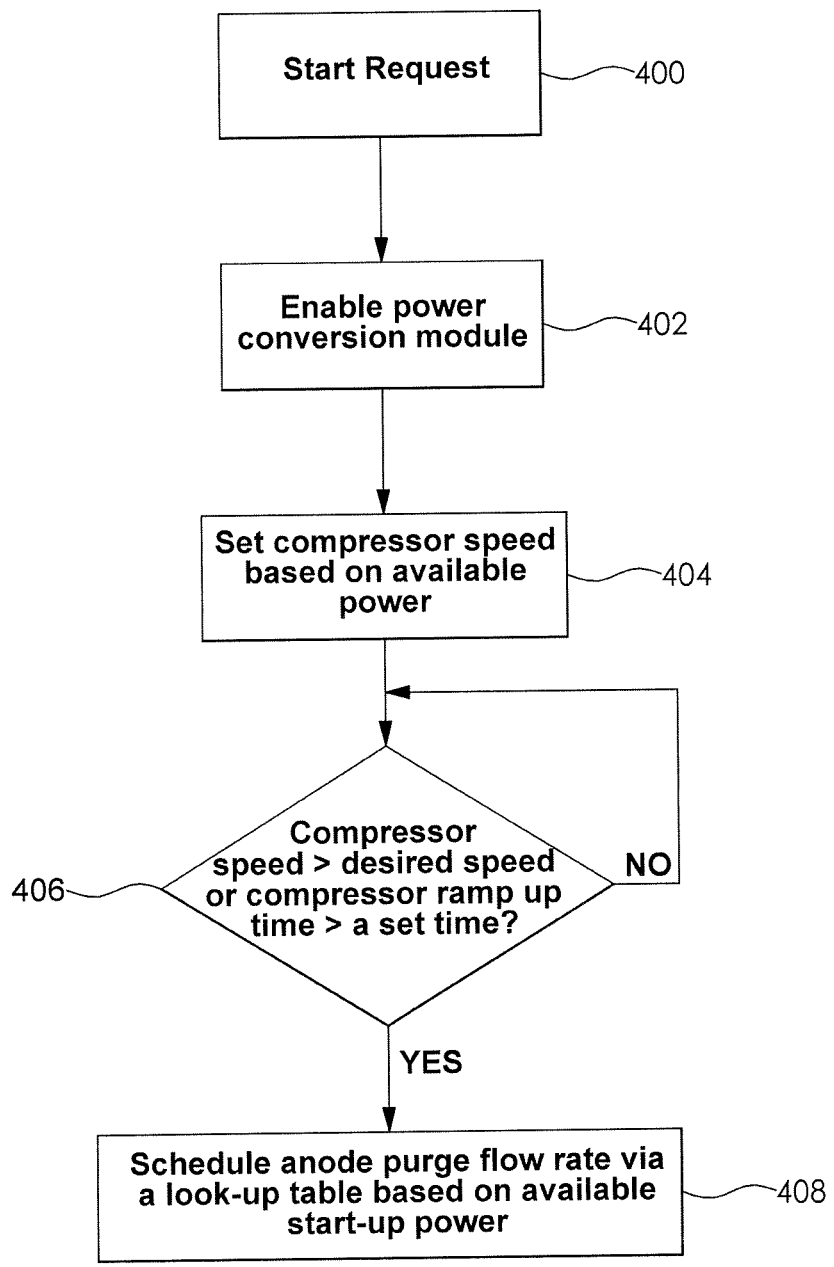
FIG. 4 is a schematic flow diagram showing a start-up method without an operable high-voltage battery.

The present disclosure further includes a method for starting the fuel cell stack 2 of the fuel cell system 200. A first method depicted in FIG. 4 may be employed with a vehicle only having access to the low-voltage battery 212 as the start-up battery at start-up. Such a vehicle may be a non-hybrid fuel cell vehicle. The method includes the step of receiving a start request 400 from an operator. The PCM 214 is then activated 402. The activation 402 of the PCM 214 boosts the voltage of the low-voltage battery 212 by increasing the low voltage to a higher voltage that can be used to power the air compressor 202.

Following the activation step 402, an available electrical energy from the boosted low-voltage battery 212 is determined. The available electrical energy may be determined, for example, by measuring the available electrical energy from the start-up battery or the PCM 214 directly. The available electrical energy may be estimated from other electrical measurements of the start-up battery or the PCM 214. In other embodiments, the available electrical energy may be determined by measuring the voltage of the low-voltage battery 212 and calculating the available electrical energy therefrom. An estimated speed of the air compressor 202 is selected 404 based on the available electrical energy. In one particular embodiment, the estimated speed is determined from a look-up table correlating the available electrical energy and the speed of the air compressor 202. It should be appreciated that the estimated speed may also be based on a calculation relating the estimated speed and the available electrical energy. The air compressor 202 is then started and the air compressor 202 is set at the estimated speed. In one example, the air compressor 202 is set at about 40,000 rpm. A skilled artisan should understand that other suitable estimated speeds may also be employed.

The method of the disclosure further includes a step 406 of measuring an actual speed of the air compressor 202 and comparing the measured actual speed with a desired speed. When the actual speed is greater than the desired speed, an anode purge based on the available electrical energy is scheduled. The anode purge is scheduled in a scheduling step 408. The desired speed is selected to provide a sufficient flow of air to the exhaust of the fuel cell system 200 in a time-optimized manner. The desired speed may be the difference between the estimated speed and a pre-selected "delta speed." For example, the delta speed may be about 2000 rpm, and the estimated speed about 60,000 rpm, resulting in a desired speed of about 58,000 rpm. In another nonlimiting example, the desired speed is a percentage of the estimated speed. Thus, the anode purge may be triggered when the actual speed approaches the desired speed.

Alternatively, when a time for the air compressor 202 to ramp up to the estimated speed has elapsed, the anode purge scheduling step 408 may be performed. In particular embodiments, the time may be sufficient for the air compressor 202 to provide an estimated sufficient air flow to the exhaust. The elapsed time may be particularly useful for triggering the anode purge scheduling step 408 when the estimated speed remains greater than the actual speed for the desired length of time. In a nonlimiting example, the time for the air compressor to ramp up may be about 5 seconds. In another nonlimiting example, the elapsed time may be an estimate based on the available electrical energy from the start-up battery and the estimated speed desired for the air compressor 202 to ramp to. Suitable time limits within which to perform the scheduling step 410 may be selected as desired.

In certain embodiments, the anode purge scheduling step 408 includes at least one of the steps of a) setting a time for the anode purge, and b) setting a flow rate for the anode purge. As nonlimiting examples, at least one of the estimated speed and the anode purge flow rate is calculated from a look-up table. The look-up table provides a relationship to the available electrical energy for start-up, and is adapted to maintain an exhausted hydrogen concentration of less than a desired amount. The preferred concentration of exhausted hydrogen is less than about four percent (4%) by volume, although other concentrations may be targeted. The anode purge step is followed by a step of providing a controlled flow of hydrogen to the anodes and a step of diverting the air flow to the cathodes, wherein the fuel cell stack 2 is placed in an operational mode.

Figure 5:
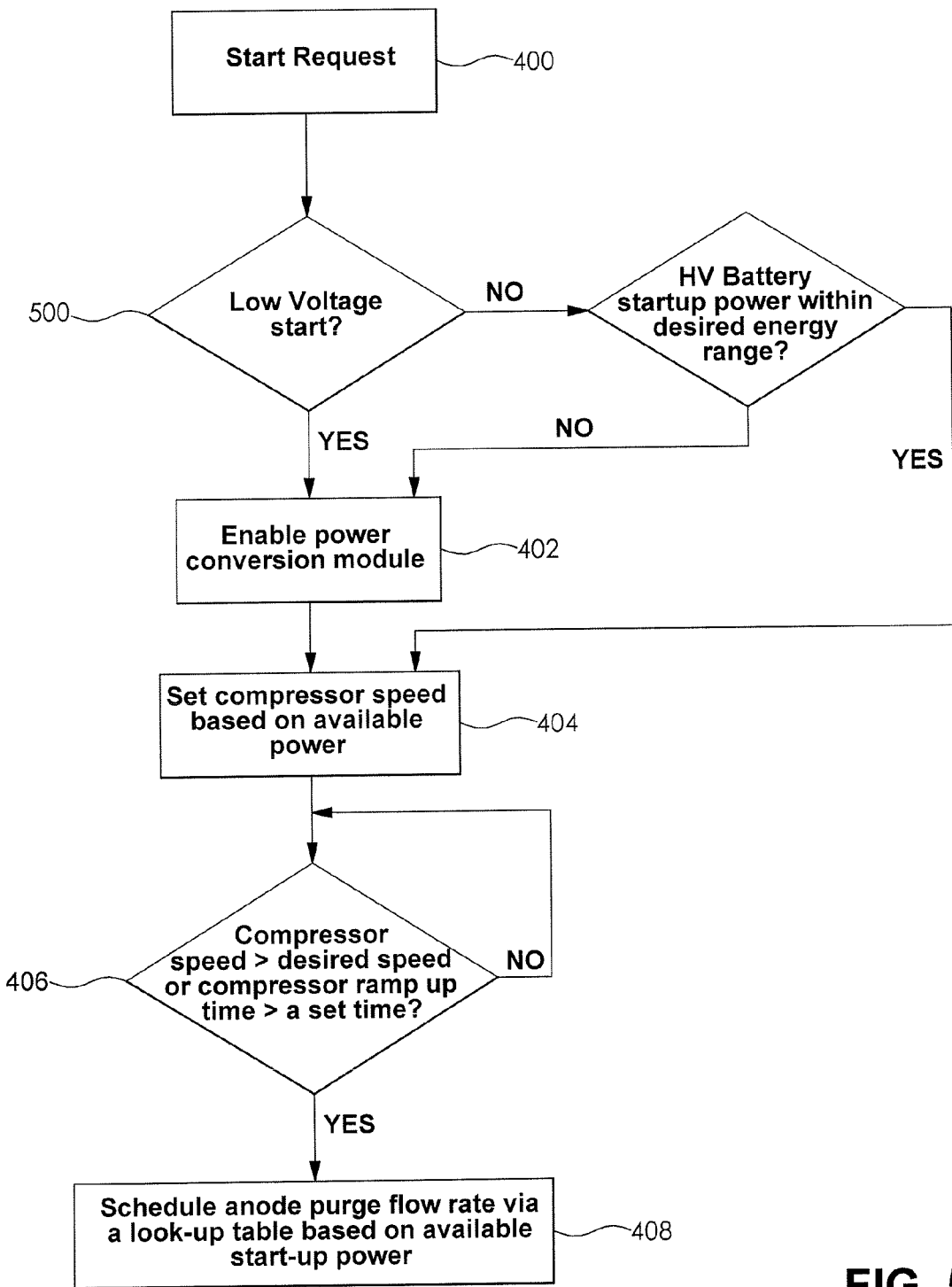
FIG. 5 is a schematic flow diagram showing a start-up method with an operable high-voltage battery.

As depicted in FIG. 5, the method of the disclosure may be used with a vehicle having access to both the low-voltage battery 212 and the high-voltage battery 300 at start-up. Such a vehicle may be a hybrid fuel cell vehicle. In one embodiment, after receiving the start request 400, the method includes an energy source selection step 500. The energy source selection step 500 includes determining the available electrical energy from at least one of a) the low-voltage battery 212 with a voltage boost, b) the high-voltage battery 300 with a voltage boost, and c) the high-voltage battery 300 without the voltage boost.

In the method of the disclosure, a start-up battery particularly employable in the start-up operation of the fuel cell stack 2 is selected from the strongest energy source. As a nonlimiting example, the low-voltage battery 212 is selected if the available electrical energy from the low-voltage battery 212 is greater than the available electrical energy from the high-voltage battery 300. In another example, the high-voltage battery 300 is selected as the start-up battery if the available electrical energy from the low-voltage battery is less than the available electrical energy form the high-voltage battery 300.

In a further embodiment, the high-voltage battery 300, without the voltage boost, is selected if the available electrical energy from the high-voltage battery 300 is within a desired start-up energy range. For example, the desired start-up energy range may be a power greater than about 1.5 kW. In a particular example, the desired start-up energy range is a power greater than about 1.8 kW. In a particularly illustrative example, the desired start-up energy range is a power greater than about 2.0 kW. A suitable start-up energy range adapted to select the start-up battery may be chosen as desired.

In another embodiment, the selected start-up battery may alternate between the low-voltage battery 212 and the high-voltage battery 300. As a nonlimiting example, if the high-voltage battery 300 is initially selected as the start-up battery, but SOC of the high-voltage battery 300 drops below the desired energy range during the start-up operation, the fuel cell system 200 may switch to the low-voltage battery 212 to complete the start-up operation. The employment of the strongest source of energy throughout the start-up operation is thereby facilitated.

It should be appreciated that the employment of the available electrical energy in selecting the start-up battery may be particularly useful in vehicles employing a high-voltage battery 300 that is a hybrid battery. For example, when the state-of-charge (SOC) of the hybrid battery is sufficient, the hybrid battery directly powers the air compressor 202 during the start-up operation. However, the low-voltage battery 212 may be employed to start-up the fuel cell stack 2 if the SOC of the hybrid battery is insufficient. Alternatively, the PCM 214 may be employed to boost the voltage of the low SOC hybrid battery if the hybrid battery has the electrical energy within the desired energy range, and would provide a greater electrical energy than the low-voltage battery 212. Thus, the present method facilitates the use of the strongest energy source in starting the fuel cell stack 2. The present method also provides a system redundancy at fuel cell start-up, militating against a start-up failure due to insufficient battery SOC or inoperability of one or more vehicle batteries.

A skilled artisan should appreciate that the method of the invention is an "open-loop" method, as opposed to a "closed-loop" method where system feedback is employed to determine anode purge conditions. The anode purge in the open-loop method is scheduled in response to the initial determination of the available electrical energy from at least one of the low-voltage battery 212 and the high-voltage battery 300. The determination of the available electrical energy for start-up of the fuel cell stack 2 enables an estimation of both the speed of the air compressor 202 and the resulting flow rate of air that will be provided to the exhaust of the fuel cell system 200. Based on the estimated flow rate of air to the exhaust, the anode purge may be scheduled accordingly so that the concentration of hydrogen in the exhaust does not exceed the desired level.

The employment of the strongest energy source during start-up of the fuel cell stack 2 militates against carbon corrosion by optimizing the rate at which hydrogen can be fed to the fuel cell stack 2. It also should be understood that the estimated compressor speed and the scheduling of the anode purge are adapted to provide the sufficient flow of air to the exhaust. The sufficient flow of air to the exhaust militates against undesirable levels of hydrogen emissions such as levels greater than about four (4) percent, for example. Thus, it is surprisingly found that employment of the open-loop system and method of the disclosure militates against fuel cell stack 2 degradation and controls vehicle emissions within desired bounds. Emissions may be controlled by determining how much and when to feed hydrogen to the fuel cell stack 2, particularly during the anode purge upon start-up.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for starting a fuel cell system having a fuel cell stack including a cathode inlet, an exhaust directly emitting from the fuel cell stack to an environment external to the fuel cell system, an air compressor in fluid communication with the cathode inlet and the exhaust, a low-voltage start-up battery in electrical communication with the air compressor, wherein the low-voltage start-up battery has an operating voltage less than a fuel cell stack operating voltage, a power conversion module in electrical communication with the low-voltage start-up battery and the air compressor, the power conversion module adapted to selectively boost a voltage of the low-voltage start-up battery supplied to the air compressor, the method comprising the steps of:

receiving a start request;
enabling the power conversion module to boost the voltage of the low-voltage start-up battery;
determining an available electrical energy from the boosted voltage of the low-voltage start-up battery;
determining an estimated speed of the air compressor based on the available electrical energy;
starting the air compressor and setting the air compressor at the estimated speed with a controller in communication with the power conversion module, wherein a flow of air bypasses the fuel cell stack and is provided to the exhaust by the compressor and no flow of air is provided to the fuel cell stack;
measuring an actual speed of the air compressor using a speed sensor in communication with the controller and directly sensing a rotational speed of the air compressor, wherein the actual speed is the rotational speed of the air compressor;
comparing the actual speed to a desired speed calculated from the estimated speed;
scheduling an anode purge based on the available electrical energy when one of a) the actual speed is greater than the desired speed, and b) a compressor ramp-up time has elapsed, wherein the step of scheduling the anode purge includes at least one of i) setting a time for the anode purge, and ii) setting a flow rate for the anode purge, and wherein the anode purge flow rate is calculated from a look-up table based on the available electrical energy;
purging an anode of the fuel cell stack; and
providing a controlled flow of hydrogen to the anodes and diverting the flow of air from the exhaust to the cathode inlet.

2. The method of claim 1, wherein the step of determining the available electrical energy includes calculating the available electrical energy from a measured voltage of the low-voltage battery.

3. The method of claim 1, wherein the desired speed is the estimated speed minus a delta speed.

4. The method of claim 1, wherein the desired speed is a percentage of the estimated speed.

5. The method of claim 1, wherein the anode purge flow rate is optimized to maintain an exhausted hydrogen concentration of less than about four percent by volume.

6. A method for starting a fuel cell system having a fuel cell stack including a cathode inlet, an exhaust directly emitting from the fuel cell stack to an environment external to the fuel cell system, an air compressor in fluid communication with the cathode inlet and the exhaust, a low-voltage start-up battery in electrical communication with the air compressor wherein the low-voltage start-up battery has an operating voltage less than a fuel cell stack operating voltage, a power conversion module in electrical communication with the low-voltage start-up battery, and the air compressor, the power conversion module adapted to selectively boost a voltage of the low-voltage start-up battery supplied to the air compressor, the method comprising the steps of:

receiving a start request;

enabling the power conversion module to boost the voltage of the low-voltage start-up battery;

determining an available electrical energy from the boosted voltage of the low-voltage start-up battery, determining an estimated speed of the air compressor based on the available electrical energy;

starting the air compressor and setting the air compressor at the estimated speed with a controller in communication with the power conversion module, wherein a flow of air bypasses the fuel cell stack and is provided to the exhaust by the compressor and no flow of air is provided to the fuel cell stack;

measuring an actual speed of the air compressor using a speed sensor in communication with the controller and directly sensing a rotational speed of the air compressor, wherein the actual speed is the rotational speed of the air compressor;

comparing the actual speed to a desired speed calculated from the estimated speed; and scheduling an anode purge based on the available electrical energy when a compressor ramp-up time has elapsed, wherein the step of scheduling the anode purge includes at least one of i) setting a time for the anode purge, and ii) setting a flow rate for the anode purge, and wherein the anode purge flow rate is calculated from a look-up table based on the available electrical energy;

purging an anode of the fuel cell stack; and providing a controlled flow of hydrogen to the anodes and diverting the flow of air from the exhaust to the cathode inlet.

* * * * *